Jan. 25, 1955  E. STUMP  2,700,551
WELDED FRAME, ESPECIALLY FOR MOTOR VEHICLES
Filed Sept. 16, 1949  2 Sheets-Sheet 1
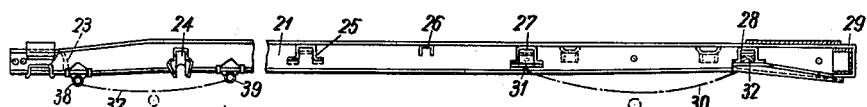
Fig.1
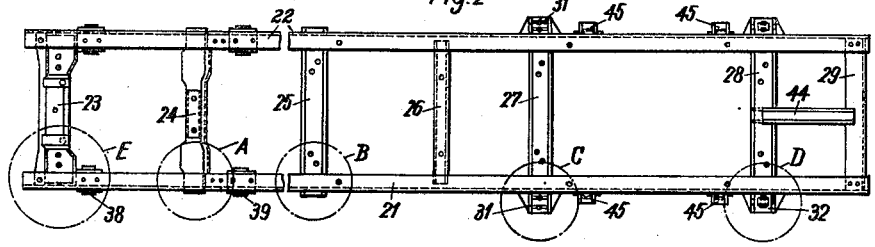
Fig.2
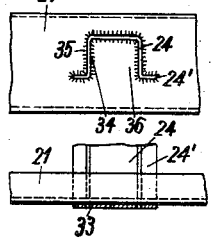
Fig.3
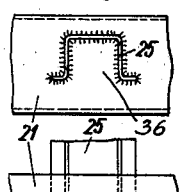
Fig.6
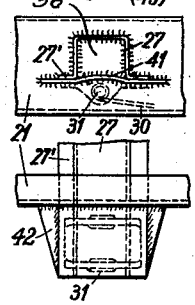
Fig.9 (43)
Fig.10
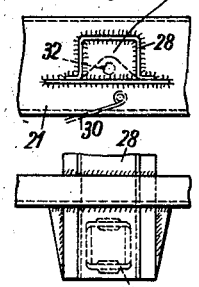
Fig.12
Fig.13
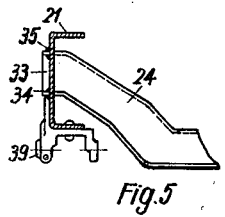
Fig.4
Fig.5
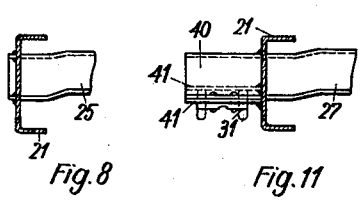
Fig.7  Fig.8  Fig.11
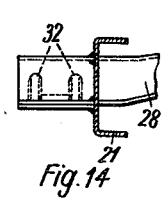
Fig.14
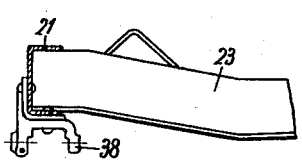
Fig.15
INVENTOR.
EUGEN STUMP
BY
Haseltine, Lake & Co.
AGENTS Jan. 25, 1955     E. STUMP     2,700,551
WELDED FRAME, ESPECIALLY FOR MOTOR VEHICLES
Filed Sept. 16, 1949     2 Sheets-Sheet 2
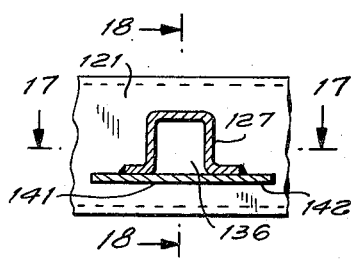
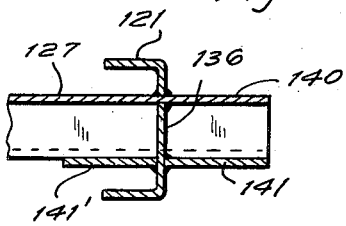
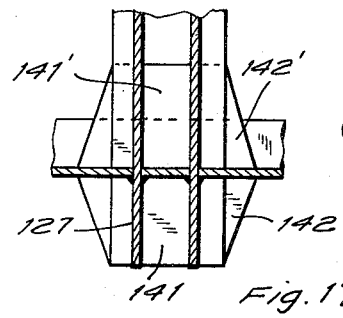
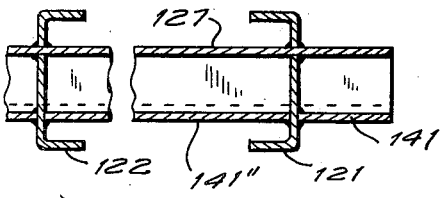
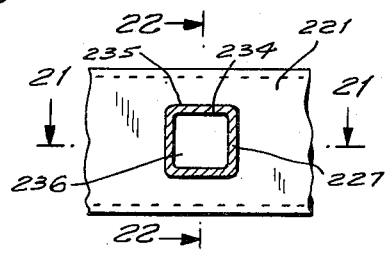
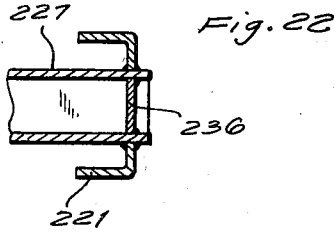
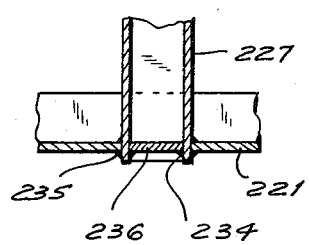
INVENTOR.
EUGEN STUMP
BY Haseltine Lake & Co.
AGENTS United States Patent Office 2,700,551
Patented Jan. 25, 1955

2,700,551

WELDED FRAME, ESPECIALLY FOR MOTOR VEHICLES

Eugen Stump, Stuttgart-Unterturkheim, Germany, assignor to Daimler-Benz Aktiengesellschaft, Stuttgart-Unterturkheim, Germany Application September 16, 1949, Serial No. 116,063

Claims priority, application Germany October 1, 1948

5 Claims. (Cl. 280—106)

This invention relates to a frame, especially for motor vehicles which consists of longitudinal and transversal girders welded together.

An essential feature of this invention consists in that either girder, e. g. a transversal girder, is conducted through recesses, perforations or apertures which are fashioned in the other girder, e. g. a longitudinal girder, according to the cross section profile of the transversal girder and then welded to the longitudinal girder in such a way that the walls of the perforated girder remain preserved between the walls of the traversing girder. The traversing girders hereby may have different cross sections, such as cornered, half open or hollow (e.g. tube shaped or rectangular).

It has been proved that by these means an essential strengthening of the frame is obtained and breakage is obviated, which otherwise would occur with high frame stresses. Owing to the walls of the perforated girders remaining preserved within the profiles of the traversing girders (half open, possibly U-shaped, or hollow), there is assured an uninterrupted coherence of material particularly if the traversing girder is welded to the perforated girder both outside and inside. This is chiefly important in the case of the traversing girder having a half open profile, seeing that such a girder, though originally not having the same torsional stiffness as a girder having a hollow profile, will gain a substantial increase of said torsional stiffness by its being welded into a corresponding recess of the other girder. To the perforated girder, eventually being a longitudinal girder having a high U- or C-shaped profile the traversing girder may be welded on both sides or on either side only, in that latter case preferably on its outside, which will be sufficient as a rule. The girders may get additional stiffness by providing bridge-like members or sheet connections which e. g. on either side or one both sides of the perforated girder will complete the half open profile of the traversing girder to a hollow profile and may be welded simultaneously to both girders. The traversing girder may eventually project beyond the perforated girder e. g. not more than is required for obtaining convenient welding connection.

In a frame composed of longitudinal and transversal girders the interlocked transversal and longitudinal girders, at least two (or preferably four) transversal girders and two longitudinal girders are connected in the above mentioned way with the result of obtaining a frame having torsional stiffness even in the event of half open U-profiles being used. In this case the transversal girders traversing and projecting beyond the longitudinal girders and serving to support on their ends the load of the vehicle or the vehicle springs are suitably completed (towards the longitudinal girders) to continuous hollow profiles by means of metal sheets, serving simultaneously to stiffen the connection with the longitudinal girders and being suitably welded both to the transversal and to the longitudinal girders. The other transversal girders or part of them will preferably project outside beyond the longitudinal girders only by an amount sufficient to permit reliable welding.

The accompanying drawings represent an embodiment of this invention having a motor vehicle frame as set forth, and more particularly:

Fig. 1 gives a side view of the frame,

Fig. 2 gives a horizontal view of the same,

Figures 3–5 show the frame connection as established in A according to Fig. 2 in a side view, a horizontal view and a longitudinal view, on an enlarged scale, Figs. 6–8 correspondingly illustrate the frame connection as established in B according to Fig. 2, Figs. 9–11 correspondingly illustrate the frame connection as established in C according to Fig. 2, Figs. 12–14 correspondingly illustrate the frame connection as established in D according to Fig. 2, Fig. 15 gives a longitudinal view of the frame connection as established in E according to Fig. 2.

Figs. 16 to 18 illustrate a further embodiment of vehicle frame according to the invention wherein Fig. 16 is a side view and Figs. 17 and 18 are respectively a section on line 17—17 of Fig. 16 and a section on line 18—18 of Fig. 16. Fig. 19 illustrates a still further form of the invention in section corresponding to that shown in Fig. 18. Figs. 20 to 22 illustrate a still further embodiment of the invention of which Fig. 20 is a side view and Figs. 21 and 22 are sections taken respectively on lines 21—21 and 22—22 of Fig. 20.

The frame is composed of the two longitudinal girders 21 and 22 and the transversal girders 23—29. The longitudinal girders have a C- or U-shaped profile opening inwardly, while the transversal girdes 23—28, being lower, have a profile opening to bottom. The transversal girder 23 being most in front and the transversal girder 29, being the last and having a C-profile opening forwardly, are butt welded to the inside surfaces of the longitudinal girders. However the transversal girders 24, 25 and 27, 28 are conducted through the longitudinal girders, the former (24, 25) projecting but slightly beyond the longitudinal girders and that by no greater amount than is required for unobjectionably welding the transversal girders to the longitudinal girders, while the transversal girders 27, 28 are conducted farther beyond the longitudinal girders, their projecting ends serving to support the rear axle spring 30 on the spring brackets 31 and 32.

As is shown e. g. by the Figs. 3–5 relating to the connection of the transversal girder 24 with the longitudinal girder 21 as established in point A, said connection is effectuated by eventually punching or burning (by means of a welding apparatus) out of the vertical wall of the longitudinal girder 21 a recess corresponding to the profile 24 (it being a U-shaped girder opening to bottom and having lateral end flanges 24'). Through this recess the transversal girder 24 is conducted in such a manner that it projects by a slight amount 33 beyond the outer surface of the longitudinal girder there being welded to the longitudinal girder by an inner weld seam 34 as well as an outer weld seam 35 (with relation to the tranversal girder). By these means the vertical wall of the longitudinal girder is perfectly compact also in the interior 36 of the transversal girder, which will practically obviate, all over the longitudinal girder and the frame connection, any places subject to breakage, at the same time resulting in a high torsional stiffness of the connection. Welding on the inside of the longitudinal girders, which is less accessible, is not required, though being e. g. provided likewise and eventually being desirable. In proximity of the transversal girders 23 and 24 there are disposed, on the longitudinal girders, the spring brackets 38 and 39 designed to support the front axle spring 37.

The connection provided on point B (Figs. 6–8) being essentially the same as on point A, the description relating to that latter applies also for point B.

As the Figs. 9–11 show with relation to point C, also in this case the longitudinal girder is provided with a recess (corresponding to the profile of the transversal girder 27 opening to bottom), through which the transversal girder is conducted, the end 40 of the transversal girder projecting beyond the longitudinal girder by such an amount as to permit securing the spring bracket 31. Welding the transversal girder to the longitudinal girder is essentially effectuated in the same way as in point A. However for further stiffening both the transversal girder and the connection of longitudinal and transversal girders there is attached from the bottom a sheet 41 to the flanges 27' of the end 40 of the transversal girder and welded both to the flanges 27' and to the longitudinal girder (on its edge having contact with the longitudinal girder). For better guiding the forces engaging on the end of the transversal girder said sheet is broadened at 42 to a kind of bridge.

The point D essentially corresponding to point C, all statements referring to the latter apply also for point D. The transversal girders 23 and 24 serve to support the motor. The two rear transversal girders 28 and 29 are mutually interlocked by an intermediate longitudinal girder 44 to effectuate stiffening for rear loads such as a spare wheel or similar items. The brackets 45 may serve to secure the shock absorbers.

In the embodiment shown in Figs. 16 to 18 not only is the end 140 of the downwardly opening U-shaped girder 127 reinforced by means of a closing sheet 141, 142 thereby to constitute a girder having a closed cross-section, but the interior of the longitudinal girder 121 is also provided with a further correspondingly shaped sheet 141', 142' welded respectively to the transverse and longitudinal girders. It should be noted that the U-shaped transverse girder 127 is inserted through a slot in the longitudinal girder 121 in such a manner that the inner wall portion 136 remains in position. In the form illustrated in Fig. 19, instead of stiffening sheet 141', there is provided a sheet member 141'' which extends throughout the whole length of the transverse girder inwardly of the two longitudinal girders 121 and 122 thereby closing the transverse girder at the lower part thereof. All the parts shown are assembled such as by welding.

In the form illustrated in Figs. 20 to 22, use is made of a transverse girder 227 which is already of closed cross-section and which is introduced through an aperture of the longitudinal girder 221, the shape of which conforms to the outer configuration of the transverse girder. This transverse girder is welded as at 235. Furthermore, a closing member 236 which conforms to the inner configuration of the transverse girder is fixed inside the transverse girder 227 by means of weld 234 in such a manner that it is situated approximately in the plane of the vertical web of the longitudinal girder 221 thereby substituting that portion of the web of longitudinal girder 221 which has been interrupted by the insertion of the hollow transverse girder and reconstituting an uninterrupted web.

The invention is not restricted to the embodiment as shown in the drawing, but may be also applied to modified embodiments.

What I claim is:

1. In a vehicle frame, two longitudinal channel beams having each a substantially vertical web portion and two substantially horizontal flange portions, said longitudinal beams being open to one side thereof, a transverse channel beam having a substantially inverted U-shaped profile, said longitudinal beams being each provided with an aperture in the web portion thereof corresponding substantially to the profile of said inverted U-shaped transverse channel beam, the ends of said transverse channel beam being inserted in said apertures, and at least one sheet member each connected to the open side of said transverse channel beam and to one side of one of said longitudinal channel beams thereby completing the cross section of said transverse channel beam to a closed hollow profile, each of said sheet members extending to a corresponding longitudinal channel beam and being firmly connected thereto and to said transverse channel beam.

2. In a vehicle frame the combination according to claim 1, wherein respective beams and sheet members are welded together.

3. In a vehicle frame the combination according to claim 1, wherein each of said sheet members widens out toward a corresponding longitudinal channel beam and extends laterally beyond the outline of said transverse channel beam, and wherein said beams and sheet members are welded together.

4. In a vehicle frame the combination according to claim 1, comprising a sheet member on each side of each of said longitudinal channel beams, each of said sheet members being connected to said transverse channel beam to close the inverted U-shaped cross section thereof to a closed profile, each of said sheet members extending to a respective longitudinal channel beam and being firmly connected thereto and to said transverse channel beam.

5. In a vehicle frame, the combination according to claim 1, wherein the ends of said transverse channel beam extend a substantial amount beyond said longitudinal channel beams, and further comprising a sheet member for each end to close the respective end to a closed hollow profile, said sheet members being welded to said transverse channel beam and to the portion of said longitudinal channel beams adjacent said transverse channel beam.

References Cited in the file of this patent

UNITED STATES PATENTS

| 1,992,710 | Matthaei | Feb. 26, 1935 |
| 2,009,963 | Matthaei | July 30, 1935 |
| 2,096,996 | Parker et al. | Oct. 26, 1937 |
| 2,113,399 | Dietrich | Apr. 5, 1938 |
| 2,121,497 | Broulhiet | June 21, 1938 |

FOREIGN PATENTS

| 108,279 | Australia | Aug. 15, 1939 |
| 313,324 | Italy | Dec. 22, 1933 |